United States Patent [19]

Deubzer et al.

[11] 4,304,820

[45] Dec. 8, 1981

[54] POLYMER IMPREGNATED WOOD AND PROCESS FOR PREPARING THE SAME

[75] Inventors: Bernward Deubzer, Burghausen; Erich Brunner, Gmunden, both of Fed. Rep. of Germany

[73] Assignee: Wacker-Chemie GmbH, Munich, Fed. Rep. of Germany

[21] Appl. No.: 116,124

[22] Filed: Jan. 28, 1980

[30] Foreign Application Priority Data

Jan. 30, 1979 [DE] Fed. Rep. of Germany ....... 2903452

[51] Int. Cl.³ .......................... B27K 3/15; B32B 27/04
[52] U.S. Cl. ...................................... 428/452; 427/44; 427/387; 427/397; 427/440; 428/447; 428/541; 428/511; 428/512; 428/513; 428/514
[58] Field of Search .............. 428/450, 541, 452, 447, 428/316, 321, 51114 514; 427/44, 387, 397, 440

[56] References Cited

U.S. PATENT DOCUMENTS

| | | | |
|---|---|---|---|
| 3,575,910 | 4/1971 | Thomas | 428/450 |
| 3,650,811 | 3/1972 | Nordstrom | 428/450 |
| 3,746,567 | 7/1973 | Nordstrom | 428/452 |
| 4,184,006 | 1/1980 | Hockemeyer | 428/452 |
| 4,201,808 | 5/1980 | Cully | 428/452 |

*Primary Examiner*—Ellis P. Robinson

[57] ABSTRACT

Impregnated wood containing a polymer which is produced in the wood from the polymerization of a monomer and/or prepolymer having aliphatic multiple bonds and crosslinked organopolysiloxanes.

The polymer impregnated wood is prepared by impregnating the wood with a mixture containing a monomer and/or prepolymer containing aliphatic multiple bonds which is capable of free radical polymerization and a crosslinkable organopolysiloxane and thereafter the monomer and/or prepolymer is polymerized and the organopolysiloxane is crosslinked in the wood.

8 Claims, No Drawings

POLYMER IMPREGNATED WOOD AND PROCESS FOR PREPARING THE SAME

The present invention relates to impregnated wood, particularly wood which has been impregnated with a mixture containing polymerizable organic compounds and crosslinkable organosilicon compounds and more particularly to a process for impregnating wood with a mixture containing polymerizable organic compounds and crosslinkable organopolysiloxanes.

BACKGROUND OF INVENTION

Wood which has been impregnated with a non-swelling vinyl-type monomer and cured by radiation or by heat and a catalyst has been described in, for example, Kirk-Orthmer, "Encyclopedia of Chemical Technology," Second Edition, Volume 22, 1970, page 381; or "Ullmanns Encyklopaedie der technischen Chemie," Fourth Edition, Volume 12, Weinheim, 1976, page 724, as being plastic wood. Generally, the wood is impregnated with a monomer such as a methacrylate ester or a prepolymer, such as a methacrylate ester prepolymer and thereafter the methacrylate ester monomer or prepolymer is polymerized.

In comparison to the plastic wood prepared heretofore, the plastic wood prepared in accordance with this invention is more resistant to water and ultraviolet light.

Therefore, it is an object of this invention to provide polymer impregnated wood having improved resistance to water. Another object of this invention is to provide polymer impregnated wood having improved resistance to ultraviolet light. A further object of this invention is to provide polymer impregnated wood containing a polymerized organic compound and a crosslinked organopolysiloxane.

SUMMARY OF INVENTION

The foregoing objects and others which will become apparent from the following description are accomplished in accordance with this invention, generally speaking, by providing polymer impregnated wood containing a polymer which is produced in the wood from the polymerization of an organic compound selected from monomers and/or prepolymers having aliphatic multiple bonds and crosslinked organopolysiloxanes. The polymer impregnated wood is prepared by impregnating the wood with a mixture containing an organic compound selected from monomers and/or prepolymers containing aliphatic multiple bonds and a crosslinkable organopolysiloxane and thereafter polymerizing the organic compound and crosslinking the organopolysiloxane in the wood.

DETAILED DESCRIPTION OF INVENTION

Organic compounds having aliphatic unsaturation which may be used in this invention are monomers having at least one aliphatic multiple bond and prepolymers having at least one aliphatic multiple bond which have been or could have been used heretofore to form plastic wood. Any organic compounds which are polymerizable by means of free radicals can be used, providing these monomers or prepolymers or mixtures of monomers and/or prepolymers and the particular organopolysiloxane used are miscible with one another, i.e., are soluble in one another or will form stable emulsions with one another. It is, however, preferred that the monomers and/or prepolymers be soluble with the organopolysiloxane employed.

Examples of suitable monomers are vinyl esters of organic acids such as vinyl acetate; aromatic vinyl compounds which may be substituted with chlorine, such as styrene, vinylnaphthalene, α-methylstyrene, vinyltoluene, p-divinylbenzene, o-chlorostyrene, and o,o-dichlorostyrene; vinyl halides such as vinyl fluoride and vinyl chloride; vinylidene halides such as vinylidene chloride; vinylidene cyanide; derivatives of acrylic acid such as acrylonitrile, esters of acrylic acid with monofunctional alcohols, e.g., ethyl acrylate, n-butyl acrylate and allyl acrylate, and esters of acrylic acids with polyfunctional alcohols, e.g., glycerine triacrylate and pentaerythritol tetraacrylate; derivatives of methacrylic acid such as methacrylonitrile, esters of methacrylic acid with monofunctional alcohols, e.g., methyl methacrylate, n-butyl methacrylate and allyl methacrylate; and esters of methacrylic acid with polyfunctional alcohols, for example glycerine trimethacrylate, trimethylolpropane trimethacrylate and pentaerythritol tetramethacrylate; and allyl compounds other than those mentioned above, for example triallyl cyanurate, diallyl phthalate and diallyl fumarate.

Examples of suitable prepolymers are prepolymerized methyl methacrylate and unsaturated polyesters.

The monomers and/or prepolymers can be used alone or as mixtures. Thus for example, n-butyl acrylate can be used as the only monomer having aliphatic multiple bonds, along with a crosslinkable organopolysiloxane. However, mixtures of two, three or more of the above mentioned monomers and/or mixtures of at least two different prepolymers can also be used in combination with a crosslinkable organopolysiloxane. Further examples of mixtures of monomers having aliphatic multiple bonds are mixtures having 10 parts by weight of styrene and 15 parts by weight of diallyl phthalate or of 22 parts by weight of n-butyl methacrylate and 3 parts by weight of trimethylolpropane trimethacrylate; also mixtures of styrene and n-butyl acrylate. Mixtures of ethylene and vinyl acetate may also be used. Prepolymers are preferably used in admixture with at least one of the above mentioned monomers along with the crosslinkable organopolysiloxanes. Examples of prepolymer-monomer mixtures are those of methyl methacrylate and prepolymerized methyl methacrylate and mixtures of styrene and unsaturated polyester.

The crosslinked organopolysiloxane present in the polymer impregnated wood of this invention is preferably produced by crosslinking a crosslinkable organopolysiloxane, having at least one siloxane unit of the group consisting of monoorganosiloxane units and diorganosiloxane units, and if desired, triorganosiloxane units, $SiO_{4/2}$ units and/or siloxane units having an Si-bonded hydrogen atom.

The monoorganosiloxane units can be represented by the formula $RSiO_{3/2}$, the diorganosiloxane units by the formula $R_2SiO$, and the triorganosiloxane units by the formula $R_3SiO_{\frac{1}{2}}$. In all of these formulas R represents the same or different monovalent hydrocarbon radicals. These organic radicals preferably contain from 1 to 12 carbon atoms. Siloxane units having one Si-bonded hydrogen atom can be represented by the general formula $R_aHSiO_{3-a/2}$, where R is the same as above, and a is 0, 1 or 2.

Examples of organic radicals represented by R, which are present in the crosslinkable or crosslinked organopolysiloxane of this invention are alkyl radicals such as the methyl, ethyl, n-propyl, isopropyl, n-butyl and sec-butyl radicals, and the octyl and dodecyl radicals; cycloalkyl radicals such as the cyclopentyl, cyclohexyl and cycloheptyl radicals; alkenyl radicals such as the vinyl and allyl radicals; aryl radicals such as the phenyl radical; alkaryl radicals such as the tolyl radicals; and aralkyl radicals such as the benzyl radical. Examples of substituted hydrocarbon radicals represented by R are halogenated hydrocarbon radicals such as the 1,1,1-trifluoropropyl radical and a,a,a-trifluorotolyl radicals, as well as the chlorophenyl and dichlorophenyl radicals. However, at least 50 percent of the number of R radicals are preferably methyl radicals because of their availability.

The crosslinkable organopolysiloxane used in the process of this invention as well as the crosslinked organopolysiloxane present in the plastic wood which is obtained by crosslinking the crosslinkable organopolysiloxane, contains from 0.5 to 2 SiC-bonded organic radicals for each Si atom.

Also, it is well known that organopolysiloxanes can be crosslinked by free radicals when these organopolysiloxanes are free of functional groups or are free of functional groups other than Si-bonded alkenyl groups. The polymerization of the monomer and/or prepolymer having aliphatic multiple bonds in the preparation of plastic wood in this invention is accomplished by means of free radicals. Thus, an organopolysiloxane free of functional groups or which are free of functional groups other than Si-bonded alkenyl groups can also be used in the preparation of plastic wood in accordance with this invention. However, in order to produce good adhesion of the organopolysiloxane to the wood, it is preferred that an organopolysiloxane be used which is capable of being crosslinked by condensation. These organopolysiloxanes are well known in the art. When these organopolysiloxanes contain from 1.9 to 2 SiC-bonded organic radicals for each silicon atom, they preferably contain terminal Si-bonded hydroxyl and/or SiOC-bonded alkyl groups having from 1 to 8 carbon atoms, such as the alkyl groups mentioned above. However, when they contain less than 1.9 SiC-bonded organic groups, then they preferably contain at least 0.01 percent by weight of the condensable groups described above.

Preferably the organopolysiloxanes which have from 0.5 to 1.89 SiC-bonded organic radicals for each Si atom, particularly the organopolysiloxanes having at least 40 mole percent of monoorganosiloxane units, have an average molecular weight of from 500 to 4,000. Those organopolysiloxanes having from 1.90 to 2 SiC-bonded organic radicals for each Si atom, preferably have an average molecular weight of from 20,000 to 500,000. Where rapid crosslinking and high strength are not required, the molecular weight of the organopolysiloxanes can be somewhat lower. If the mixture containing the organopolysiloxane and polymerizable monomer and/or prepolymer is of a sufficiently low viscosity that the wood can be satisfactorily impregnated under the pressure and temperature conditions used, then a solvent need not be employed. Where the molecular weight of the organopolysiloxanes are higher, then a solvent may be necessary in order to achieve satisfactory impregnation; however it is preferred that the amount of solvent be kept to a minimum. Mixtures of different organopolysiloxanes, for example those with different degrees of polymerization and/or different degrees of substitution, can be used.

The crosslinkable organopolysiloxane is preferably used in an amount of from 30 to 75 percent by weight, based on the total weight of the crosslinkable organopolysiloxane and polymerizable monomer and/or prepolymer.

Any wood which could have been used heretofore in the preparation of plastic wood can also be used in this invention. Examples of such woods are red beech, common beech, poplar, maple, birch, alder, spruce, pine, larch and oak. The wood can be in the form of lumber or in the form of wood products, especially particle board or fiberboard.

The wood can be impregnated with a mixture containing a polymerizable monomer and/or prepolymer containing aliphatic multiple bonds and a crosslinkable organopolysiloxane, and other substances if desired, by the same techniques which have been used heretofore to impregnate wood with a monomer and/or prepolymer containing aliphatic multiple bonds in the preparation of plastic wood, or with wood preservatives. Thus, wood may be immersed in a mixture containing the polymerizable monomer and/or prepolymer and the crosslinkable organopolysiloxane. The pressure of the surrounding atmosphere, about 1 bar, can be used in the process. An increased or reduced pressure may also be used.

The formation of free radicals for the purpose of polymerizing the monomer and/or prepolymer containing aliphatic multiple bonds can be accomplished by high-energy irradiation such as alpha, beta, or gamma rays or ultraviolet rays, or by heating (thermally initiated free radical formation). However, the free radicals are preferably produced by chemical agents which generate free radicals, and therefore at least one such chemical agent for generating free radicals is preferably included in the mixture containing the polymerizable monomer and/or prepolymer having aliphatic multiple bonds and crosslinkable organopolysiloxane.

The preferred chemical agents for generating free radicals are the organic peroxide compounds. However, other chemical agents for generating free radicals can also be used. Examples of such other chemical agents which may be employed to generate free radicals are azo compounds in which the two nitrogen atoms of the azo group are bonded to tertiary carbon atoms and the remaining valences of the tertiary carbon atoms are saturated by nitrile, carboxyl, cycloalkylene, or alkyl groups, such as azobisisobutyronitrile, enolizable a-phenylcarbonyl compounds and sulfinic acids.

Examples of preferred chemical agents for generating free radicals are diacyl peroxides such as benzoyl peroxide and lauroyl peroxide; ketoperoxides such as acetone peroxide and cyclohexanone peroxide; hydrocarbon hydroperoxides such as tert-butyl hydroperoxide, cumene hydroperoxide and decahydronaphthalene hydroperoxide; dihydrocarbon peroxides such as di-tert-butyl peroxide and dicumyl peroxide; perketals such as 1,1-di-tert-butyl-peroxy-3,3,5-trimethylcyclohexane; peresters such as tert-butyl perbenzoate, tert-butylperoxy isopropyl percarbonate, tert-butyl pivalate, tert-butyl peroctoate, tert-butyl cyclohexyl percarbonate, tert-butyl permaleate and tert-butyl perisononanoate; and acetyl cyclohexanesulfonyl peroxide.

Mixtures of different free radical generating agents may also be used.

The amount of chemical agent for generating free radicals is preferably from 0.0005 to 5 percent by weight, particularly 0.003 to 2 percent by weight, based on the total amount of organopolysiloxane and monomer and/or prepolymer to be polymerized.

The temperatures and pressures used in the polymerization of monomer and/or prepolymer containing aliphatic multiple bonds can be the same as used in prior processes in which the monomer and/or prepolymer containing aliphatic multiple bonds are polymerized. Temperatures of from 20° to 200° C., particularly 50° to 175° C. and pressures of 0.1 to 20 bar are preferred.

Crosslinking of the crosslinkable organopolysiloxane can be achieved prior to, during and/or after the polymerization of the monomer and/or prepolymer containing aliphatic multiple bonds. If crosslinking is to be carried out prior to the polymerization, or if the polymerization process itself does not cause crosslinking of the crosslinkable organopolysiloxane, then the mixture containing monomer and/or prepolymer having aliphatic multiple bonds to be polymerized and the crosslinkable organopolysiloxane must contain an organopolysiloxane which is crosslinked by condensation and also must contain a crosslinking agent having at least three condensable groups and/or atoms per molecule which are capable of crosslinking with the crosslinkable organopolysiloxane, and a condensation catalyst, if desired. However, if the mixture contains as the crosslinkable organopolysiloxane, an organopolysiloxane having SiC-bonded alkenyl groups, particularly vinyl groups, then the mixture must include at least one organosilicon compound having at least 2 Si-bonded hydrogen atoms per molecule; and if necessary at least one catalyst which promotes the addition of Si-bonded hydrogen to Si-bonded alkenyl groups.

Examples of crosslinking agents having at least three condensable groups and/or atoms per molecule are alkyl silicates such as tetraethoxysilane, alkyl polysilicates such as "Ethyl Silicate 40," i.e., an ethyl polysilicate having an $SiO_2$ content of about 40 percent by weight, and isopropyl silicate; trialkoxysilanes such as methyltriethoxysilane and methylbutoxydiethoxysilane; alkyltriacyloxysilanes such as methyltriacetoxysilane, partial hydrolyzates of methyltriethyoxysilane having an $SiO_2$ content of 60 percent by weight, and methylhydrogenpolysiloxanes. Mixtures of different crosslinking agents can be used. Crosslinking agents are preferably used in amounts of from 0.5 to 150 percent by weight, preferably from 1 to 100 percent by weight, based on the weight of the crosslinkable organopolysiloxane.

Condensation catalysts which may be employed are organic compounds, such as acylates alcoholates and chelates, especially acetylacetonates of the second, third and/or fourth elemental groups of the Mendeleef Periodic System and the transition metals of the first to eighth sub-groups of the Mendeleef Periodic System, as well as the lanthanide series. Examples of condensation catalysts are acylates, alcoholates and chelates of B, Pb, Al, Zn, Co, Ti, or Sn. Specific examples of such preferred condensation catalysts are lead 2-ethylhexoate, lead naphthenate, zinc naphthenate, zinc 2-ethylhexoate, tin 2-ethylhexoate, dibutyltin diacetate, dibutyltin dilaurate, cobalt 2-ethylhexoate, cobalt naphthenate, aluminum naphthenate, aluminum triacetylacetonate, aluminum isopropoxide and polymeric butyl titanate. Other condensation catalysts which may be used are ferric naphthenate, calcium naphthenate, cerium naphthenate and cerium 2-ethylhexoate. Additonal examples of condensation catalysts are quaternary ammonium compounds such as tetramethylammonium acetate and tetramethylammonium hydroxide.

Mixtures of different condensation catalysts may also be employed in this invention.

Some of the condensation catalysts mentioned above, such as compounds of boron, tin and titanium, also act as wood preservatives.

Condensation catalysts are preferably used in amounts of from 0.001 to 3 percent by weight, based on the total weight of monomer and/or prepolymer containing aliphatic multiple bonds and crosslinkable organopolysiloxane.

Methylhydrogenpolysiloxanes are examples of organosilicon compounds having at least 2 Si-bonded hydrogen atoms per molecule. In crosslinking an organopolysiloxane having Si-bonded alkenyl groups, it is preferred that such organosilicon compounds having Si-bonded hydrogen be used in an amount such that from 0.1 to 15 Si-bonded hydrogen atoms are present for each Si-bonded aliphatic multiple bond.

Examples of catalysts which promote the addition of Si-bonded hydrogen to Si-bonded alkenyl groups are compounds or complexes of platinum, such as platinum-olefin complexes. Such catalysts are preferably used in amounts of from 0.5 to 500 ppm weight, calculated as Pt and based on the total weight of monomer and/or prepolymer containing aliphatic multiple bonds and crosslinkable organopolysiloxane.

In addition to the polymerizable monomer and/or prepolymer and crosslinkable organopolysiloxane, as well as the crosslinking agents and catalysts, if desired, the mixture used in preparing the polymer impregnated wood of this invention may also contain other substances such as insecticides, fungicides, bactericides, stabilizers, accelerators, inhibitors, and fireproofing agents.

Crosslinking of the crosslinkable organopolysiloxane is preferably carried out at temperatures of from 20° to 175° C.

The plastic wood prepared in accordance with this invention can be used as structural material for building, in machine construction, in land vehicles, ships and aircraft, and in the manufacture of musical instruments.

In the following examples, all percents are by weight unless otherwise specified.

EXAMPLE 1

Small boards 140 mm×95 mm×15 mm of seasoned European spruce, beech and linden were immersed at the same time in a mixture containing 25 percent methyl methacrylate and 75 percent of a methylpolysiloxane consisting of 95 mole percent monomethylsiloxane units and 5 mole percent dimethylsiloxane units and having 1 percent of Si-bonded hydroxyl groups and 3 percent of Si-bonded ethoxy groups with a 55° C. softening point and an average molecular weight of 3,000 to which were added 0.75 percent by weight of dibutyltin dilaurate, 0.5 percent by weight of tert-butyl perbenzoate and 0.1 percent by weight of a solution containing 1 percent cobalt in the form of cobalt 2-ethylhexoate in methyl methacrylate. By reducing the pressure in the immersion vessel to about 16 mbar and then allowing the pressure to rise again to about 1 bar, a thorough saturation of the boards was accomplished. After the impregnated boards were removed from the immersion vessel, they were stored for 24 hours at room temperature, and then heated for 2 hours at 70° C., 2 hours at 90° C. and finally 2 hours at 110° C.

EXAMPLE 2

The procedure described in Example (1) is repeated except that a mixture consisting of 50 percent of the organopolysiloxane described in Example (1) and 50 percent of n-butyl acrylate is substituted for the mixture of methylpolysiloxane and methyl methacrylate of Example (1).

EXAMPLE 3

The procedure described in Example (1) is repeated except that a mixture consisting of 30 percent of the organopolysiloxane described in Example (1) and 70 percent styrene is substituted for the mixture of the methylpolysiloxane and methyl methacrylate of Example (1).

EXAMPLE 4

The procedure described in Example (1) is repeated except that a mixture consisting of 60 percent of the organopolysiloxane described in Example (1), 25 percent of methyl methacrylate and 15 percent of a partial hydrolyzate of methylhydrogenpolysiloxane having 40 mole percent of Si-bonded ethoxy groups and a viscosity of 20 $mm^2s^{-1}$ at 25° C. is substituted for the mixture of the methylpolysiloxane and methyl methacrylate of Example (1).

EXAMPLE 5

The procedure described in Example (1) is repeated except that a mixture consisting of 37.5 percent of the organopolysiloxane described in Example (1), 25 percent of methyl methacrylate, and 37.5 percent of the partial hydrolyzate of methyltriethoxysilane having 40 mole percent of Si-bonded ethoxy groups and a viscosity of 20 $mm^2s^{-1}$ at 25° C. is substituted for the mixture of the methylpolysiloxane and methyl methacrylate of Example (1).

EXAMPLE 6

The procedure described in Example (1) is repeated except that a mixture consisting of 49.5 percent of a dimethylpolysiloxane having one Si-bonded hydroxyl group in each terminal unit and a viscosity of 20,000 $mm^2s^{-1}$ at 25° C., 1 percent of ethyl polysilicate with an $SiO_2$ content of approximately 40 percent by weight, and 49.5 percent of methyl methacrylate is substituted for the mixture containing the methylpolysiloxane and methyl methacrylate of Example (1).

What is claimed is:

1. A polymer impregnated wood which is obtained by impregnating wood with a mixture containing an organic compound selected from the group consisting of monomers, prepolymers and mixtures thereof having aliphatic multiple bonds, which is capable of free radical polymerization and a crosslinkable organopolysiloxane having from 0.5 to 2 Si-C bonded organic radicals for each Si atom selected from the class consisting of monovalent hydrocarbon radicals and halogenated monovalent hydrocarbon radicals and Si-bonded functional groups selected from the class consisting of Si-bonded hydrogen atoms, Si-bonded hydroxyl groups and SiOC-bonded alkyl groups and thereafter polymerizing and crosslinking the impregnated mixture in the wood.

2. An improved process for preparing polymer impregnated wood in which the wood is impregnated with an organic compound containing aliphatic multiple bonds selected from the group consisting of monomers, prepolymers and mixtures thereof, and thereafter the organic compound is polymerized in the wood by means of free radicals; the improvement which comprises impregnating the wood with a mixture containing the polymerizable organic compound and a crosslinkable organopolysiloxane having from 0.5 to 2 SiC-bonded organic radicals for each Si atom selected from the class consisting of monovalent hydrocarbon radicals and halogenated monovalent hydrocarbon radicals and Si-bonded functional groups selected from the class consisting of Si-bonded hydrogen atoms, Si-bonded hydroxyl groups and SiOC-bonded alkyl groups and thereafter polymerizing and crosslinking the impregnated mixture in the wood.

3. The improved process of claim 2, wherein the crosslinkable organopolysiloxane contains Si-bonded hydroxyl groups and is crosslinked by condensation.

4. The improved process of claims 2 or 3, wherein the crosslinkable organopolysiloxane is present in an amount of from 30 to 75 percent by weight, based on the total weight of the crosslinkable organopolysiloxane and polymerizable organic compound.

5. The improved process of claim 2, wherein the crosslinkable organopolysiloxane contains SiC-bonded aliphatic multiple bonds and at least one organosilicon compound having at least 2 Si-bonded hydrogen atoms per molecule.

6. The improved process of claim 5, wherein the organosilicon compound is present in such an amount that from 0.1 to 15 Si-bonded hydrogen atoms are present for each Si-bonded aliphatic multiple bond.

7. The improved process of claim 5, wherein a catalyst is present which promotes the addition of Si-bonded hydrogen to Si-bonded aliphatic multiple bonds.

8. The improved process of claim 2, wherein the organopolysiloxane contains SiOC-bonded alkyl groups having from 1 to 8 carbon atoms.

* * * * *

UNITED STATES PATENT AND TRADEMARK OFFICE
CERTIFICATE OF CORRECTION

PATENT NO. : 4,304,820
DATED : December 8, 1981
INVENTOR(S) : Bernward Deubzer, Erich Brunner, Herman Wilhelm and Konrad Sallersbeck It is certified that error appears in the above-identified patent and that said Letters Patent are hereby corrected as shown below:

Page 1, column 1, under "Inventors:", after "Erich Brunner, " insert --- Herman Wilhelm and Konrad Sallersbeck ---

Signed and Sealed this

Twenty-third Day of March 1982

|SEAL|

*Attest:*

*Attesting Officer*

GERALD J. MOSSINGHOFF

*Commissioner of Patents and Trademarks*